June 13, 1939.  A. W. KLOMP  2,161,897
UNIVERSAL GEAR CUTTER
Filed May 29, 1937  4 Sheets-Sheet 2
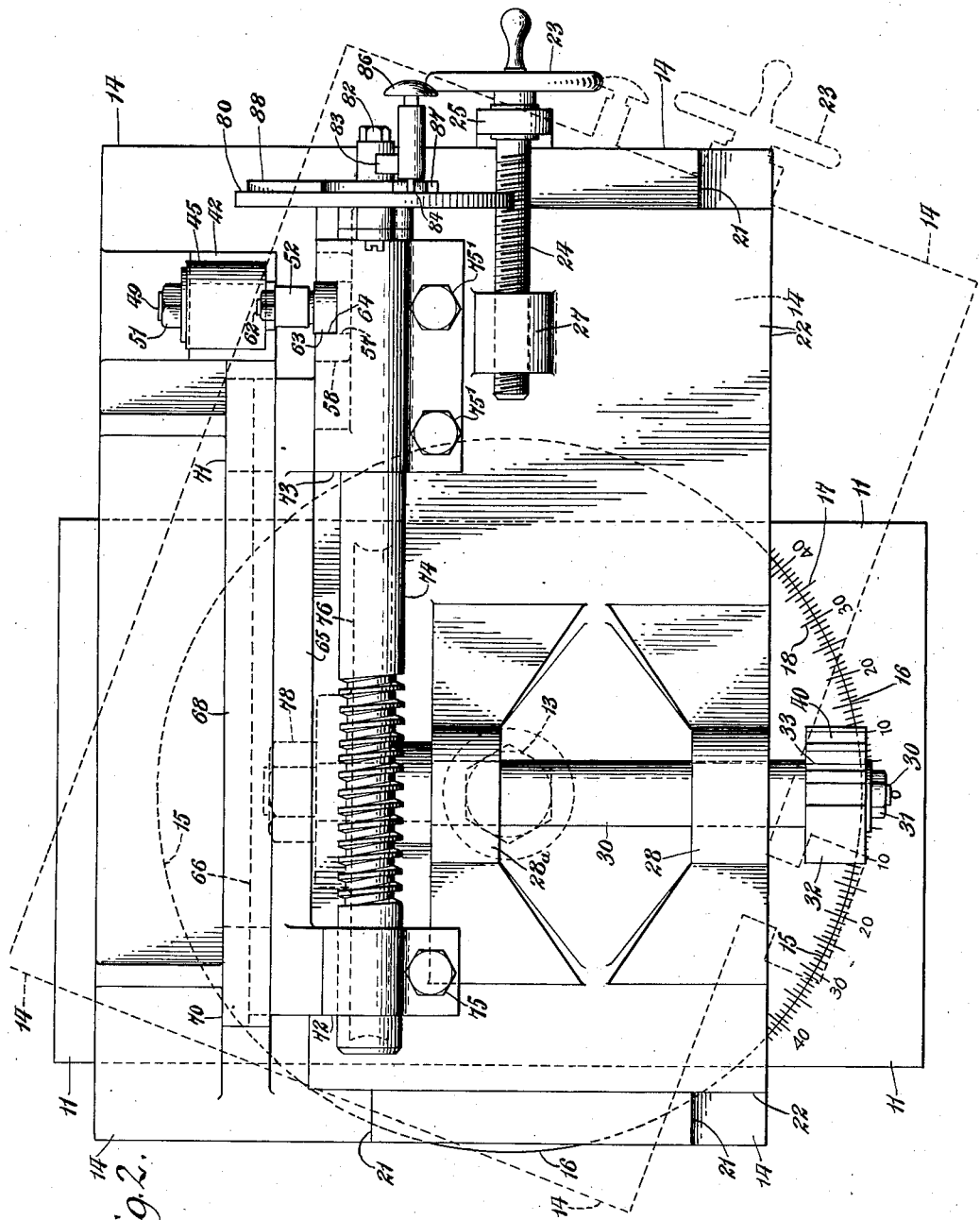

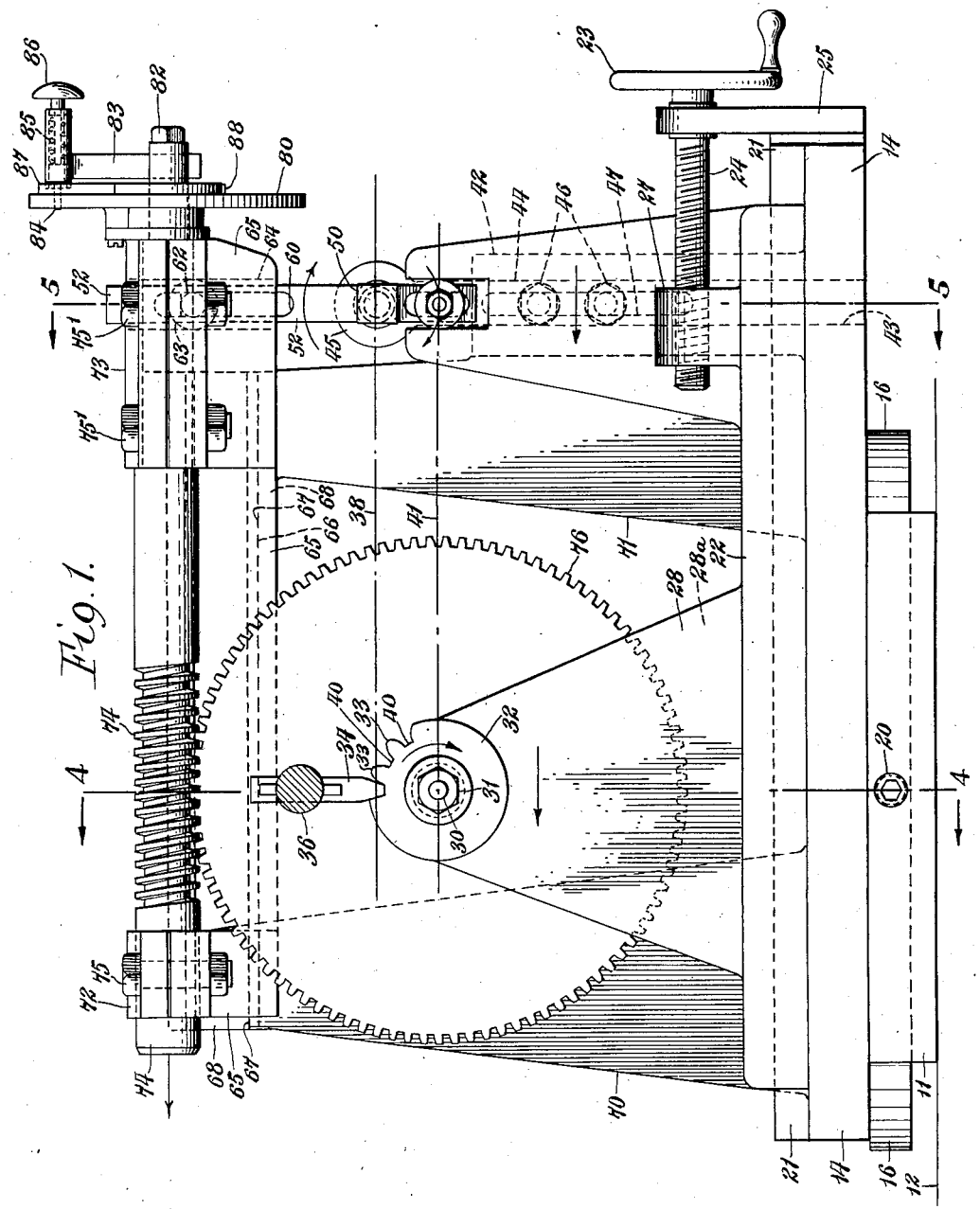

June 13, 1939.  A. W. KLOMP  2,161,897
UNIVERSAL GEAR CUTTER
Filed May 29, 1937  4 Sheets-Sheet 3
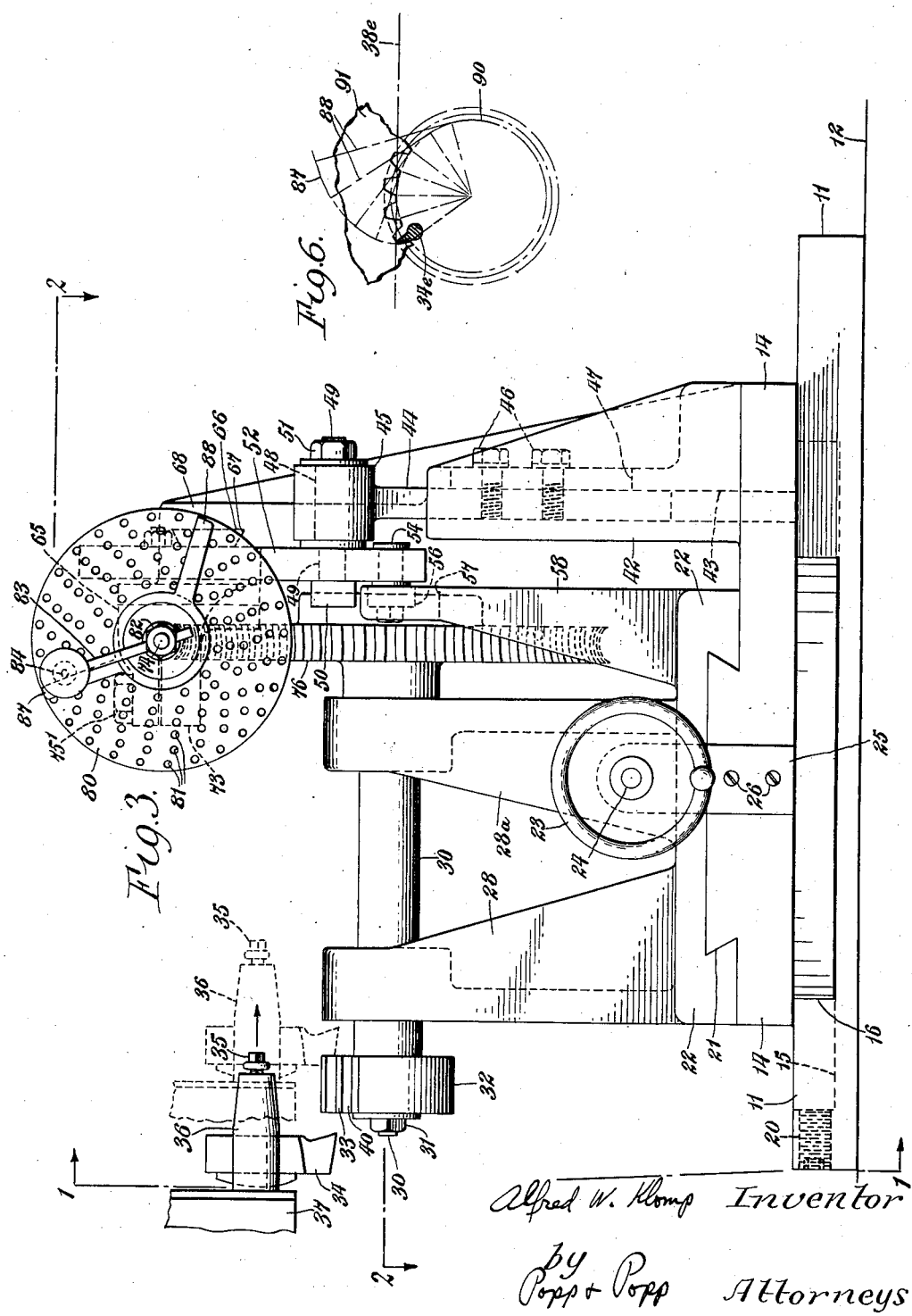
Alfred W. Klomp Inventor
by Popp & Popp Attorneys June 13, 1939. A. W. KLOMP 2,161,897
UNIVERSAL GEAR CUTTER
Filed May 29, 1937 4 Sheets-Sheet 4
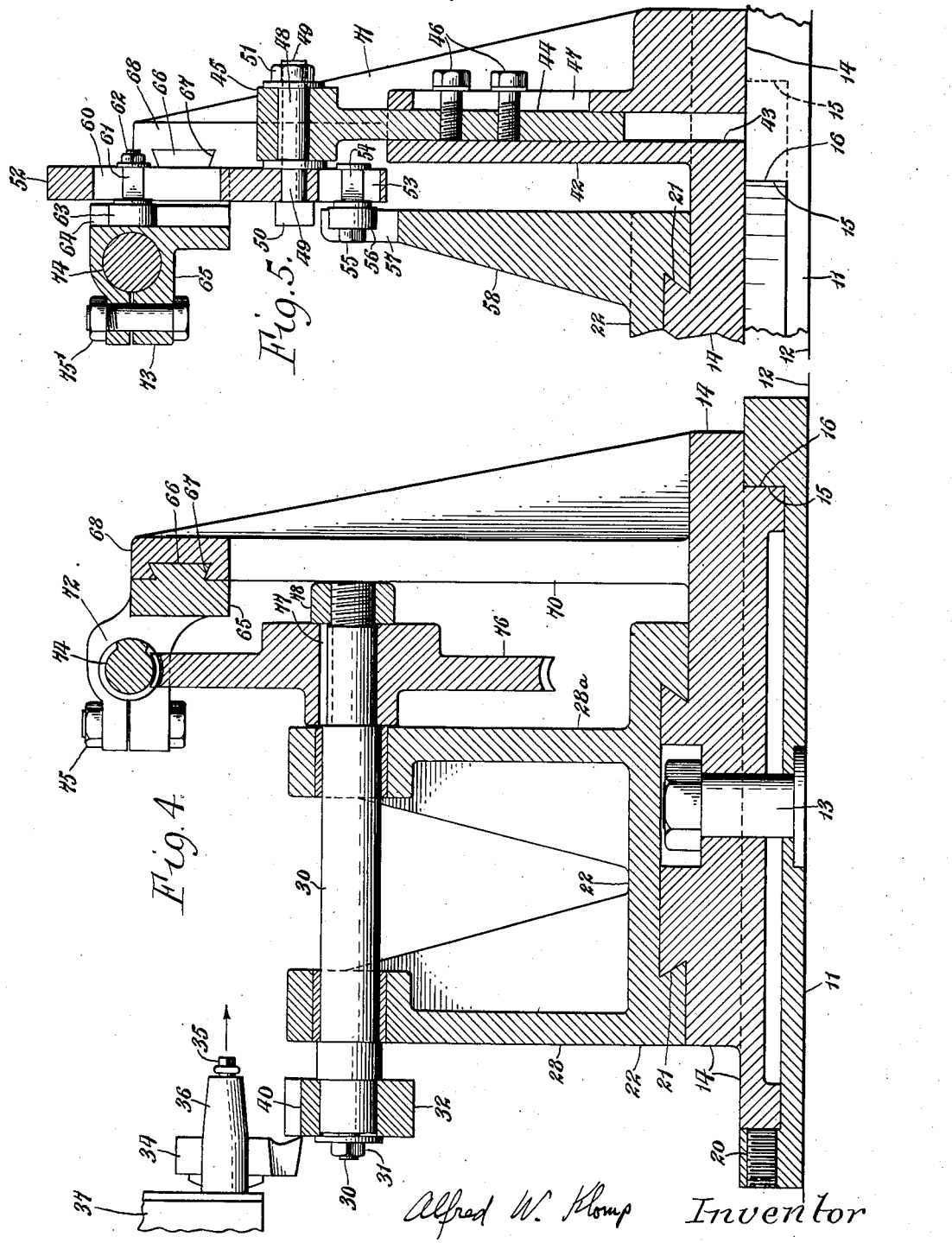
Alfred W. Klomp Inventor
by Popp & Popp Attorneys Patented June 13, 1939

2,161,897

UNITED STATES PATENT OFFICE 2,161,897

UNIVERSAL GEAR CUTTER

Alfred W. Klomp, Detroit, Mich.

Application May 29, 1937, Serial No. 145,596

10 Claims. (Cl. 90—9)

This invention relates to a universal gear cutter which is capable of cutting practically any conceivable type of annular, multi-toothed article, such as an external, internal, spiral, hypoid and herringbone gear, a spline, a worm, etc., in combination with a cutting tool on a planar or a plain milling cutter on a milling machine.

The object of the invention is to provide such a universal gear cutter which, although not capable of operating efficiently on a production basis, is capable of producing small quantities of a very wide variety of multi-toothed articles without the use of the usual change gears, base disks, tapes, etc.

The present invention may be constructed in various manners, the particular structure disclosed in the appended drawings being only one form of machine for carrying the invention into practical effect.

In these drawings:

Fig. 1 is a front elevation of a universal gear generator constructed in accordance with my invention, taken on line 1—1, Fig. 3.

Fig. 2 is a top plan thereof, taken on line 2—2, Fig. 3.

Fig. 3 is an end elevation thereof.

Figs. 4 and 5 are vertical, transverse sections thereof, taken on correspondingly numbered lines of Fig. 1.

Fig. 6 is a diagram illustrating how the gear cutter is set up for cutting internal gears.

In the following description similar characters of reference indicate like parts in the several figures of the drawings.

Figs. 1–5 illustrate the present invention as employed in a planer to cut a plain, spur gear from an annular gear blank or work piece 32. The rectangular bed plate 11 of the present invention is clamped or bolted in the usual and well-known manner to the top horizontal face 12 of the table of the planer. Secured to and extending upwardly from this bed plate 11, as shown in Figs. 4 and 2, is a pivot post 13 upon which is swiveled a main plate or base 14. To prevent the pivot post 13 from receiving excessive strains, the bed plate 11 is preferably annularly countersunk at 15 to receive the annular centering head 16, which is integral with and projects downwardly from the base 14, concentrically with the countersink 15 and the pivot post 13. To facilitate arranging the base 14 in the desired angular position relatively to the bed plate 11, the latter, as best shown in Fig. 2, is inscribed with an arcuate scale 17 and a similar, juxtaposing, arcuate scale 18 is inscribed on the base 14. If desired, one of the scales may be eliminated and replaced by a single zero line as is common practice. When the base 14 is in the desired angular position it is clamped in place by a headless set screw 20 which is threaded through the front part of the bed plate 11 and bears with its nose against the centering head 16 of the base 14.

Formed longitudinally on the base 14 is an inverted V or keystone type of guideway 21 upon which is slidably mounted a slide 22. The longitudinal movement of this slide may be effected either by power or manually, the latter being employed in the machine shown in the accompanying drawings, through the instrumentability of a hand, feed wheel 23 which is connected to the outer end of a feed screw 24. The latter is journaled in the upper end of a thrust block 25 which is connected by flat head screws 26 with the base 14. Said feed screw 24 is restrained against longitudinal movement relatively to said thrust block 25 in the usual and well-known manner and its threads engage with a tapped lug 27 which projects integrally and upwardly from the adjacent portion of the slide 22.

Also integrally formed with said slide are a pair of web-braced posts 28 and 28a which are transversely in line with each other and have a horizontal, transverse mandrel 30 journaled in their extreme upper ends. Detachably secured by a clamp nut 31 to the reduced front, outboard end of said mandrel 30 is the work piece 32 which is being cut, the same in Figs. 1–5 being a plain, spur gear, some of the teeth 33 of which are illustrated in Fig. 1 as having been already cut.

The cutting operation in the particular machine here illustrated is effected by a cutting tool 34 which is clamped in the usual and well-known manner by a set screw 35 to a tool post 36 which latter is mounted in the reciprocating head 37 of a conventional planer. The profile of this cutting tool 34, as seen in Fig. 1, has three flat faces corresponding to the shape of a single rack tooth of appropriate pitch. It is obvious that such a planer cutting tool may be replaced by a rotary milling cutter and the gear cutting operation effected in a milling machine, if this is desired.

In Fig. 1 the horizontal line 38 represents the pitch "circle" of the rack, the "circle" in this case having an infinite radius and hence being a straight line. It is obvious that if, theoretically, the cutting tool 34 can be moved longitudinally while it is being reciprocated, and if, at the same time, the work piece 32 can be rotated at a proper speed, said work piece will have a gap 40 cut in its periphery of such shape as to form teeth 33, when the operation is repeated, and that these teeth 33 will be of such form as to properly mesh with a rack having teeth the shape of the profile of the cutting tool 34. In actual practice, of course, such factors as back lash and root clearance must also be taken into account, but such factors are well known by those skilled in the art and are deemed to require no further comment here.

If instead of theoretically moving the cutting tool longitudinally and also reciprocating it, as just described, we actually only reciprocate said cutting tool, and then both rotate the work piece and also move it longitudinally, the same cutting effect is, of course, produced. This is the method used in the machine here illustrated, the cutting tool 34 only reciprocating, while the work piece 32, as viewed in Fig. 1, is rotated in a clockwise direction at a certain speed and its axis moved translationally toward the left along a line 41 at a speed corresponding to its rotary speed. Such a movement has been adopted because it is much simpler to obtain in actual practice than one in which the axis of the work piece is stationary and the rack or its theoretical equivalent, the cutting tool 34, caused to move longitudinally along the line 38.

After each tooth gap 40 has been cut, the work piece 32 is indexed in a manner shortly to be described, so as to cut a plurality of tooth gaps 40 into the periphery of the work piece 32.

Projecting integrally upwardly from one of the rear corners of the base 14 is a vertical, hollow post 42 having a rectangular bore 43. Received in this bore is a rectangular leg 44 having a pivot head 45 formed at its upper end. Vertical adjustment of said pivot head 45 relatively to the base 14 is effected by a pair of clamp, cap screws 46 which are threaded into the rear face of said leg 44 and have the rear portions of their shanks received in a vertical slot 47 formed in the rear vertical wall of the hollow post 42.

Pivotally arranged in said pivot head 45 is a horizontal pivot 48 which, in the particular form of the invention herein disclosed, consists of a spacing bushing encircling a pivot bolt 49, the latter having a square head 50 and a nut 51. Secured by said bolt to the horizontal pivot 48 is a rock lever 52 which is thereby in effect, pivotally mounted in the pivot head 45 so as to swing in a vertical longitudinal plane. The lower end of said rock lever is provided with a radial, adjustment slot 53 which receives the square shank 54 of a lower roller spindle 55 upon the front end of which is journaled a lower roller 56. The latter is received within an open, rectangular, vertical runway 57 which is formed in the upper end of a thrust post 58 extending integrally upwardly from an adjacent portion of the slide 22. Thus, as said slide 22 is caused to move horizontally and longitudinally under the influence of the hand wheel 23, the runway 57 of its post 58 bears against the lower roller 56 and causes the rock lever 52 to partially rotate about its pivot 48, which, after all adjustments have been completed, is fixed or stationary.

The upper end of the rock lever 52 is provided with a radial adjustment slot 60 which receives the square shank 61 of an upper roller spindle 62 upon the front end of which is journaled an upper roller 63. This roller is received within an open, rectangular, vertical runway 64 which is formed in the one end of a worm carriage 65. The latter is provided with a long, horizontal, longitudinal, keystone tenon 66, as best shown in Figs. 4 and 5. This tenon slides horizontally and longitudinally in a guideway 67 which is formed in a horizontal, longitudinal truss bar 68 formed integrally at the upper ends of a pair of posts 70 and 71, the latter being integrally connected at their lower ends with the base 14. Thus as the slide 22 is moved longitudinally in the one direction, it causes a partial rotation of the rock lever 52 and the latter causes a proportional but reverse movement of the worm carriage 65.

Journaled horizontally and longitudinally at its opposite ends in bearings 72 and 73 in the worm carriage 65 is a worm 74. To prevent any unnecessary play in these bearings 72 and 73 at the opposite ends of said worm, said bearings are preferably, though not necessarily, split as best shown in Figs. 5 and 1, the one bearing 72 being adjustably closed by an adjusting bolt 75 while the other bearing is adjustably closed by a pair of adjusting bolts 75'.

The screw thread of said worm 74 is disposed intermediate of its bearings 72, 73 and meshes with the teeth of a worm wheel 76. The latter is detachably secured by a key 77 and clamp nut 78 to the rear end of the mandrel 30 as best shown in Fig. 4. Hence, as the slide 22 is moved in one longitudinal direction and carries the mandrel 30 and work piece 32 bodily with it, said work piece is caused to rotate in proportion to this longitudinal movement.

In the set-up of the machine as here illustrated, the axis of the fulcrum or pivot 48 of the rock lever 52 lies in a horizontal plane 38 (see Fig. 1) which, 1. includes the pitch "circle" of the theoretical rack of which the cutting tool 34 forms one theoretical tooth, and 2. intersects the pitch circle of the work piece 32. The other horizontal plane 41 intersects the axis of said work piece 32 and also the axis of the lower roller 56, while a horizontal plane intersecting the pitch circle of the worm wheel 76 at its point of tangency with the pitch circle (cylinder) of the worm 74, also intersects the axis of the upper roller 63. This relationship is valuable in enabling the workman to easily set up and check the entire apparatus but this particular relationship is not essential in carrying out the objects of the invention, the only essentials being, 1. that the pivot 48 be located on the base 14 and, 2. that the ratio of the distances of the rollers 63 and 56 from the fulcrum 48 of the rock lever 52 be proportional to the pitch diameters, respectively, of the worm wheel 76 and the work piece 32. As far as the factors so far discussed are concerned, the pitch of the worm 74 and worm wheel 76 and the diameter of said worm are entirely immaterial, inasmuch as said worm, as thus far described, has functioned merely as a rack, and hence its effect upon the worm wheel 76 is solely a function of the pitch diameter of said worm wheel.

Each time the slide 22 is moved one stroke in one direction, the cutting tool 34 cuts one complete gap 40 in the work piece 32, said gap being, in effect, two-halves of one of the teeth 33 of said work piece. After any one gap 40 has thus been cut on the one stroke of the slide 22, it is necessary to index the work piece 32 and then to feed the slide a full stroke in either the opposite direction or in the same direction to cut the next gap 40. This indexing is effected as follows:

Secured to the outer end of the long bearing 73 of the worm carriage 65 and disposed concentrically with respect to its worm 74 is a conventional index plate 80 having the usual annular rows of holes 81, the number of holes in each row being different from the number of holes in any of the other rows. Secured by a nut 82 to the outboard end of the worm 74 is the usual, radially-adjustable index arm 83 having the usual, longitudinally movable plunger 84 arranged at its outer end and resiliently urged toward the index plate 80 by the usual compression spring 85 and manually retracted therefrom by the usual plunger knob 86. To facilitate each successive indexing operation, the usual pair of radially disposed angular distancing arms 87, 88 is preferably provided, the angle between said arms being adjustable in the usual manner. Hence, by successively retracting the plunger 84 from any one hole in one of the annular rows of holes 81, and turning the worm 74 until said plunger registers with the desired next hole in the same annular row of holes 81, causes the worm to be rotated a specific angular distance for each indexing. Because of the fact that there are a considerable and different number of holes in each annular row of holes 81, and the further fact that there are a number of such annular rows, enables a wide variety of sizes and types of work pieces to be cut without requiring any changing of the worm 74 and the worm wheel 76.

In Figs. 1-5, the machine is shown as set up for cutting a plain spur gear from the work piece 32. In this case the base 14 is arranged perpendicularly to the bed plate 11, as viewed from above, i. e., with the scales 18 and 17 of said base and bed plate registering with each other in their zero position, as shown in Fig. 2, and with the direction of movement of the cutting tool 34 lying in a vertical plane intersecting the axis of the mandrel 39. If a spiral gear is to be cut, the headless set screw 20 is loosed and the base 14 swung around to some such desired angular position as that indicated shown by dotted lines in Fig. 2. In such case the cutting tool would have to be ground down more narrow than the full rack-shaped cutting tool 84 of Fig. 1.

In Figs. 1-5 it is the pitch diameter of the work piece upon which the setting up of the machine is effected. This is ordinarily the simplest method of setting up the machine for external gears, but it should be understood that such a basis for the set up is not necessary. For instance, the set up calculations may be based on the root circle or some other base circle which is situated inside the pitch circle. In such a case, of course, a different shaped cutting tool would have to be employed than that shown in Fig. 1, but such an arrangement, despite its greater complexity, is definitely advantageous under certain circumstances. For instance, a certain available cutting tool may be employed to cut a gear having a theoretical rack tooth different in shape from the tool used, without requiring that said tool be reground to a different pressure angle and/or thickness. Also such an arrangement permits the cutting of two different involute curves in a single tooth profile, for example, a semi-profile based upon a 14½° pressure angle extending from the root of the tooth to the pitch line, and then another semi-profile based upon a 20° pressure angle extending from the pitch line to the tip of the tooth. Such a dual profile is definitely valuable in certain members, such as spline keys where it is desirable to avoid the undercutting which would occur when the number of teeth is small and when a "rack" type of tool, such as that shown in Fig. 1, is used.

The question of basing the set up on some base circle instead of on the pitch circle is vital in the case of internal gears, because, ordinarily, a cutting tool based upon the pitch circle would not have adequate clearance in the cutting operation. How internal gears ordinarily should be cut on a machine constructed in accordance with the present invention is illustrated diagrammatically in Fig. 6. In this case, for purposes of clarity, the profile of one of the tooth faces has been extended along the line 87 and the "unwinding", involute, construction lines 88 also shown so as to graphically illustrate the derivation of this involute profile. In this case a slotting tool 34e is employed, the same being mounted in the tool post 36 of a reciprocating planer head, similar to the mounting of the cutting tool 34 shown in Fig. 3. It will be noted that the point of this slotting tool lies in a horizontal plane 38e which intersects the root circle 90 of the internal gear 91, although any other base circle located well within the pitch circle could ordinarily be employed.

The present invention is also capable of duplicating anything that can be produced by the hobbing process, but this ordinarily requires a cutting tool having a formed shape corresponding to the tooth of the hob. This has particular application to the cutting of splined shafts and herring bone gears. In the latter case the present invention is definitely more efficient than the production of such gears by the hobbing process. The present invention may also be used for the cutting of worms.

From the foregoing it will be seen that the present invention is capable of producing an extremely wide variety of toothed or splined members by merely adjusting the heights of the three pivot points of the rock lever 52, and that only under unusual circumstances will it be necessary to change the worm 74 and worm wheel 76 and/or the index plate 80 for some special work.

It is to be understood that while only one form of the invention has been illustrated, the scope of the invention is to include any type of machine covered by the following claims.

I claim as my invention:

1. A gear cutter comprising: a base; a slide movably arranged on said base; a mandrel rotatably mounted on said slide and adapted to hold a work piece; a cutting tool adapted to be reciprocated relatively to said base; a rock pivot pivoted on said base; means for actuating said rock pivot in accordance with the movement of the slide; a worm wheel arranged on said mandrel; a worm engaging said worm wheel; and means for moving said worm longitudinally in accordance with the movement of the rock pivot.

2. A gear cutter comprising: a base; a slide movably arranged on said base; a mandrel journaled on said slide and adapted to hold an externally toothed work piece; a cutting tool having a rack-shaped tooth and adapted to be reciprocated relatively to said base; a rock pivot pivoted on said base and having its axis lying in a plane which intersects the pitch circle of the work piece and is parallel to the line of movement of the slide; means for actuating said rock pivot in accordance with the movement of the slide; and means for rotating said mandrel in accordance with the movement of said rock pivot.

3. A gear cutter comprising: a base; a slide movably arranged on said base; a mandrel journaled on said slide and adapted to hold an internally toothed work piece; a slotting tool adapted to be reciprocated relatively to said base; a rock pivot pivoted on said base and having its axis lying in a plane which intersects the base circle of the work piece and is parallel to the line of movement of the slide; means for actuating said rock pivot in accordance with the movement of the slide; and means for rotating said mandrel in accordance with the movement of said rock pivot.

4. A gear cutter comprising: a base; a slide movably arranged on said base; a mandrel journaled on said slide and adapted to hold a work piece; a worm wheel on said mandrel; a worm carriage slidably mounted on said base; a worm journaled in said worm carriage and engaging with said worm wheel; a cutting tool adapted to be reciprocated relatively to said base; a rock lever fulcrumed on said base, the ratio of the length of the arms of said lever being equal to the ratio of the pitch diameters of the work piece and the worm wheel; and operative connections between the one arm of said lever and the slide and between the other arm of said lever and the worm carriage.

5. A gear cutter comprising: a base; a slide movably arranged on said base; a mandrel journaled on said slide and adapted to hold a work piece; a worm wheel on said mandrel; a worm carriage slidably mounted on said base; a worm journaled in said worm carriage and engaging with said worm wheel; a cutter tool adapted to be reciprocated relatively to said base; a rock lever fulcrumed on said base on an axis lying in a plane which intersects the pitch circle of the work piece and is parallel to the path of movement of the slide; and operative connections between the one arm of said lever and the slide and between the other arm of said lever and the worm carriage.

6. A gear cutter comprising: a base; a slide movably arranged on said base; a mandrel journaled on said slide and adapted to hold a work piece; a worm wheel on said mandrel; a worm carriage mounted on said base; a worm journaled in said worm carriage and engaging with said worm wheel; a cutting tool adapted to be reciprocated relatively to said base; a rock lever fulcrumed on said base on an axis lying in a plane which intersects the pitch circle of the work piece and is parallel to the path of movement of said slide, the length of the arms of said lever being equal, respectively, to the pitch radius of the work piece and the pitch radius of the worm; and operative connections between the one arm of said lever and the slide and between the other arm of said lever and the worm carriage.

7. A gear cutter comprising: a base; a slide horizontally, movably arranged on said base and having a vertical runway; a cutting tool adapted to be reciprocated relatively to said base; a mandrel journaled on said base and adapted to hold a work piece; a worm wheel on said mandrel; a worm carriage slidably arranged on said base and having a vertical runway; a worm journaled in said worm carriage; a fulcrum block adjustably arranged vertically on the base; and a rock lever fulcrumed on said fulcrum block and having rollers on its arms engaging, respectively, with the vertical runway in the slide and the vertical runway in the worm carriage.

8. A gear cutter comprising: a base; a slide horizontally movably arranged on said base and having a vertical runway; a cutting tool adapted to be reciprocated relatively to said base; a mandrel journaled on said base and adapted to hold a work piece; a worm wheel on said mandrel; a worm carriage slidably arranged on said base and having a vertical runway; a worm journaled in said worm carriage; a fulcrum block adjustably arranged vertically on the base; and a rock lever fulcrumed on said fulcrum block and having rollers on its arms engaging, respectively, with the vertical runway in the slide and the vertical runway in the worm carriage, the position of each of these rollers in the lever being adjustable.

9. A gear cutter comprising: a base; a slide horizontally, movably arranged on said base and having a vertical runway; a cutting tool adapted to be reciprocated relatively to said base; a mandrel journaled on said base and adapted to hold a work piece; a worm wheel on said mandrel; a worm carriage slidably arranged on said base and having a vertical runway; a worm journaled in said worm carriage; and index head arranged on said worm carriage and controlling the rotary position of said worm relatively to said worm carriage; and a rock lever fulcrumed on the base and having rollers on its arms engaging, respectively, with the vertical runway in the slide and the vertical runway in the worm carriage.

10. A gear cutter comprising: a base; a slide horizontally, movably arranged on said base and having a vertical runway; a cutting tool adapted to be reciprocated relatively to said base; a mandrel journaled on said base and adapted to hold a work piece; a worm wheel on said mandrel; a worm carriage slidably arranged on said base and having a vertical runway; a worm journaled in said worm carriage; an index head arranged on said worm carriage and controlling the rotary position of said worm relatively to said worm carriage; and a rock lever fulcrumed on the base and having rollers on its arms engaging, respectively, with the vertical runway in the slide and the vertical runway in the worm carriage, the ratio of the distances of said rollers from the fulcrum of said lever being equal to the ratio of the pitch diameters of the work piece and the worm wheel.

ALFRED W. KLOMP.